United States Patent
James et al.

(10) Patent No.: US 10,715,502 B2
(45) Date of Patent: Jul. 14, 2020

(54) SYSTEMS AND METHODS FOR AUTOMATING CLIENT-SIDE SYNCHRONIZATION OF PUBLIC KEYS OF EXTERNAL CONTACTS

(71) Applicant: VERISIGN, INC., Reston, VA (US)

(72) Inventors: Stephen Daniel James, South Riding, VA (US); Andrew Fregly, Herndon, VA (US); Andrew Cathrow, Ashburn, VA (US)

(73) Assignee: VERISIGN, INC., Reston, VA (US)

( * ) Notice: Subject to any disclaimer, the term of this patent is extended or adjusted under 35 U.S.C. 154(b) by 195 days.

(21) Appl. No.: 14/986,389

(22) Filed: Dec. 31, 2015

(65) Prior Publication Data

US 2017/0195299 A1 Jul. 6, 2017

(51) Int. Cl.
*H04L 29/06* (2006.01)
*H04L 12/58* (2006.01)

(52) U.S. Cl.
CPC .......... *H04L 63/0442* (2013.01); *H04L 51/00* (2013.01); *H04L 51/02* (2013.01); *H04L 63/0428* (2013.01); *H04L 63/06* (2013.01); *H04L 63/061* (2013.01); *H04L 63/062* (2013.01); *H04L 63/0823* (2013.01)

(58) Field of Classification Search
CPC . H04L 63/0442; H04L 63/06; H04L 63/0823; H04L 63/061
See application file for complete search history.

(56) References Cited

U.S. PATENT DOCUMENTS

| | | | | |
|---|---|---|---|---|
| 7,716,479 B2* | 5/2010 | Vargas | ...................... | H04L 9/30 713/150 |
| 8,176,334 B2* | 5/2012 | Vainstein | ............ | G06F 21/6218 713/189 |
| 2004/0171369 A1* | 9/2004 | Little | ................... | G06Q 10/107 455/410 |

(Continued)

FOREIGN PATENT DOCUMENTS

| | | | | |
|---|---|---|---|---|
| WO | | 2005096543 A1 | 10/2005 | |
| WO | WO | 2005096543 A1 * | 10/2005 | ......... H04L 63/0428 |
| WO | | WO-2005096543 A1 * | 10/2005 | ......... H04L 63/0428 |

OTHER PUBLICATIONS

NPL Search (IP.com) (Year: 2020).*
Extended European Search Report for Application No. 16205476.1 dated Mar. 30, 2017.

*Primary Examiner* — Mahfuzur Rahman
*Assistant Examiner* — Richard W Cruz-Franqui
(74) *Attorney, Agent, or Firm* — Artegis Law Group, LLP

(57) ABSTRACT

Systems and methods for automating client-side synchronization and discovery of public keys and certificates of external contacts include a key synchronizer at a client device. The key synchronizer obtains, from the client device, an external contact associated with an external domain outside of a local domain of the client device and then identifies, based on the external domain, a public key registry outside of the local domain. The key synchronizer obtains, from the public key registry, a registry-supplied public key or digital certificate for the external contact and then stores the registry-supplied key as a locally-stored key in the local key store such that the client device can obtain and apply the locally-stored key to secure an email targeting the external contact as a recipient of the email.

17 Claims, 9 Drawing Sheets

(56) References Cited

U.S. PATENT DOCUMENTS

| | | | |
|---|---|---|---|
| 2005/0081045 A1* | 4/2005 | Nicodemus | H04L 9/3271 |
| | | | 713/182 |
| 2007/0055867 A1* | 3/2007 | Kanungo | H04L 9/088 |
| | | | 713/156 |
| 2007/0136390 A1* | 6/2007 | Blum | G06F 16/27 |
| 2009/0198997 A1* | 8/2009 | Yeap | H04L 63/0823 |
| | | | 713/155 |
| 2009/0215477 A1* | 8/2009 | Lee | H04L 51/38 |
| | | | 455/466 |
| 2010/0017593 A1* | 1/2010 | Putz | H04L 9/3073 |
| | | | 713/150 |
| 2012/0124369 A1* | 5/2012 | Amenedo | H04L 63/062 |
| | | | 713/156 |
| 2013/0080785 A1* | 3/2013 | Ruhlen | H04L 67/16 |
| | | | 713/176 |
| 2013/0254328 A1* | 9/2013 | Inoue | H04L 29/08 |
| | | | 709/217 |
| 2014/0143381 A1* | 5/2014 | Gould | H04L 61/1511 |
| | | | 709/217 |
| 2014/0282982 A1* | 9/2014 | Rothschild | H04L 63/0815 |
| | | | 726/8 |
| 2016/0110266 A1* | 4/2016 | Nara | G06F 11/1456 |
| | | | 707/680 |
| 2017/0195299 A1* | 7/2017 | James | H04L 63/0442 |

\* cited by examiner

SYSTEMS AND METHODS FOR AUTOMATING CLIENT-SIDE SYNCHRONIZATION OF PUBLIC KEYS OF EXTERNAL CONTACTS

FIELD

The present disclosure relates generally to automating client-side synchronization and discovery of public keys and certificates of external contacts.

BACKGROUND

As a result of the increasing popularity and acceptance of the computer and the Internet and other forms of networked communications, electronic transactions and documents are increasing in number and significance. For example, the volume of consumer purchases, business-to-business commerce, and stock trading and other forms of investing that occur over the Internet and/or wireless networks is steadily increasing, as are other forms of online commerce. In addition, the number of documents which are generated or available electronically and the number of documents which exist only in electronic form (e.g., the paperless office) are also steadily increasing.

The increasing number of electronic transactions and documents leads to a corresponding need for reliable methods for making records of these transactions and documents. For example, when a consumer purchases an item over the Internet using his credit card, it is desirable to make a reliable, non-disputable record of the purchase. If two corporations electronically "sign" a contract, it is desirable to record both the act of signing and the contents of the contract. In the paperless office, it is desirable to "digitally notarize" certain documents, thus ensuring that their existence at a specific time can be proved at a later date.

One approach to the records problem makes use of cryptography. The characteristics of public key cryptography in particular may be used in various ways to make strong records of transactions. For example, in the consumer Internet example, a consumer with a digital certificate might create a digital signature of his order including the credit card number, thus creating a record of the purchase. In the contract example, the two corporations might similarly create a two-party digital signature of the contract, each corporation using its digital certificate. In the digital notary example, a third party (i.e., the notary) might witness the document by affixing a time stamp and a digital signature to the document.

Secure (e.g., encrypted) email and document signing and verification via public key cryptography rely on the use of private and public key pairs. Public keys can include identity keys, digital or identity certificates, and the like. When networked devices want to interact with entities over the Internet via secure email, the networked devices' local key stores must contain the entities' public keys for the networked devices to verify the entities' cryptographic signature or enable encrypted data exchanges with the entities. However, networked devices and their users often encounter difficulties when interacting or exchanging signed and encrypted documents with other entities over the Internet via secure email. For instance, no general adopted means currently exists for the users to discover and obtain public keys required for such secure interactions or data exchanges. Instead, provisioning of sender public keys into a recipient's local key store is currently a manual process not familiar to most users. Even for users that are familiar, the manual process is error prone and usually involves exchanging public keys with the sender over an insecure communication channel via an out-of-band method, thus subjecting "secure" interactions and exchanges to compromise. Moreover, users trust certificates that are signed by any one of many certificate authorities, but certificate authorities are not foolproof and indeed have mistakenly signed unauthorized certificates.

Thus, there is a need for simple and intuitive approaches for users to discover and obtain public keys required for conducting public key cryptography-based secure interactions or data exchanges.

SUMMARY

Implementations of the present disclosure relate to systems and methods for automating client-side synchronization and discovery of public keys of external contacts. Public keys can include identity keys, certificates (e.g., digital certificates, identity certificates, etc.), and the like. Specifically, a key synchronization system according to various implementations can addresses the above-described and other issues by acquiring and storing, locally on a client device operating in a local domain, public keys of external contacts corresponding to external entities that operate in and/or are associated with external domains outside of the local domain. The key synchronization system automates the client-side synchronization of the external contacts' public keys, and can do so in a manner transparent to client-side applications, such as an email application running on the client device, that use a local key store of the client device to find public keys. The automated client-side synchronization of public keys simplifies the use of public key cryptography for secure communications and data exchanges without requiring modifications to the client-side applications. Thus, the key synchronization system encourages greater adoption of public key cryptography, and thus makes the Internet more secure.

The key synchronization system can support a variety of public key registries, which can operate outside of the local domain. To interact with multiple types as well as multiple instances of public key registries, the key synchronization system can include a domain-to-registry mapping service that provides a mapping between various domains and the public key registries responsible for provisioning public keys for the domains. The domain-to-registry mapping service can select at least one of the public key registries to query for public keys belonging to entities in a particular domain.

The key synchronization system can include a key synchronization service that can dynamically retrieve, from the public key registries, an external contact's public key not found in the local key store. The key synchronization system can provide the key synchronization service via an application programming interface ("API") or a plug-in, and one or more client-side applications can be enhanced to call the key synchronization service to dynamically retrieve one or more external contacts' public keys that are not found in the local key store. For example, when an enhanced email application detects an email being drafted that specifies the external contact as a recipient, the enhanced email application can use a key synchronization service API or plug-in to retrieve the external contact's public key from the public key registries.

The key synchronization system can include a key synchronizer running on the client device to obtain contacts from the client device, for example, by polling or parsing contact lists (e.g., address books, certificate stores, etc.) and emails stored on the client device. The key synchronizer can locally store, in the local key store, more than one public key for each of the contacts. For example, the key synchronizer can locally store multiple public keys for one contact that expire at different times, so that when one of the contact's locally-stored public keys expires, the key synchronizer can transition to a different one of that contact's locally-stored public keys that is valid.

In various implementations, the key synchronizer can search for and obtain only external contacts belonging to external entities that operate in external domains outside of the client device's local domain. Alternatively or in addition, the key synchronizer can filter the contacts to exclude contacts that are in the local domain. The key synchronizer can monitor the client device for any new or modified external contacts, and can also monitor the local key store for locally-stored copies of public keys that have become invalid, e.g., revoked, expired, about to expire, etc. While monitoring the client device, the key synchronizer can poll the contact lists, email application, or the local key store for external contacts that are new or modified and/or whose locally-stored copies of public keys have become invalid. The key synchronizer can poll for such external contacts periodically or in response to key synchronization service requests.

Subsequent to obtaining the external contacts, the key synchronizer can identify external domains associated with the external contacts and query the domain-to-registry mapping service to select, based on the external domains, at least one of the public key registries to query for public keys belonging to the external contacts. The key synchronizer can send a query to the selected public key registry to obtain registry-supplied public keys for the external contacts, as well as send a query to the local key store to access local copies of the external contacts' public keys. The key synchronizer can synchronize the local key store with the selected public key registry based on the registry-supplied public keys. For example, the key synchronizer can determine, for each external contact, whether or not a local copy of the external contact's public key in the local key store is outdated or invalid by comparing the local copy to the external contact's registry-supplied public key. If the local copy is deemed outdated or invalid, then the key synchronizer can update the local key store with at least one registry-supplied public key for the external contact.

In various embodiments, the key synchronization system can include a key publisher operating in the local domain that automatically synchronizes public keys of local contacts with the public key registries. The key publisher can operate in the local domain and outside of the key synchronizer running on the client device. Alternatively or in addition, the key synchronizer can provide (not shown) the key publisher, and thus the key publisher can run on the client device as a part of the key synchronizer. The key publisher can communicate or operate in conjunction with the key synchronizer to obtain and use the local contacts' information from the local domain's directory server and publish the local contacts' public keys to at least one public key registry. The key publisher can discover public keys by periodically searching through the directory server for local contacts and their associated public keys. The directory server can also push such information to the key publisher in response to additions, deletions, and updates made to at least one local directory managed by the directory server. The key publisher can publish new or modified public keys to the public key registries, and can also delete (i.e., unpublish), from the public key registries, public keys for local contacts that are no longer in the local directory.

In various implementations, the key synchronizer can periodically query the public key registries to find published public keys for the local contacts, verify the published public keys against those stored in the directory server, and then perform updates and deletes so that the local contacts' public keys stored in the public key registries are consistent with the local contacts' public keys stored in the directory server. When searching the local directory, the key synchronizer can use "white" and "black" lists to filter which local contacts are subject to discovery and consequent publishing of their public keys.

Implementations of the present disclosure relate to a key synchronization system for automating client-side synchronization and discovery of public keys and certificates of external contacts. The key synchronization system includes a key synchronizer at a client device. The key synchronizer can obtain, from the client device, an external contact associated with an external domain outside of a local domain of the client device and then identify, based on the external domain, a public key registry outside of the local domain. The key synchronizer can obtain, from the public key registry, a registry-supplied public key or digital certificate for the external contact and then store the registry-supplied key as a locally-stored key in the local key store such that the client device can obtain and apply the locally-stored key to secure an email targeting the external contact as a recipient of the email.

It is to be understood that both the foregoing general description and the following detailed description are exemplary and explanatory only and are not restrictive of the implementations, as claimed.

DETAILED DESCRIPTION

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Figure 1:
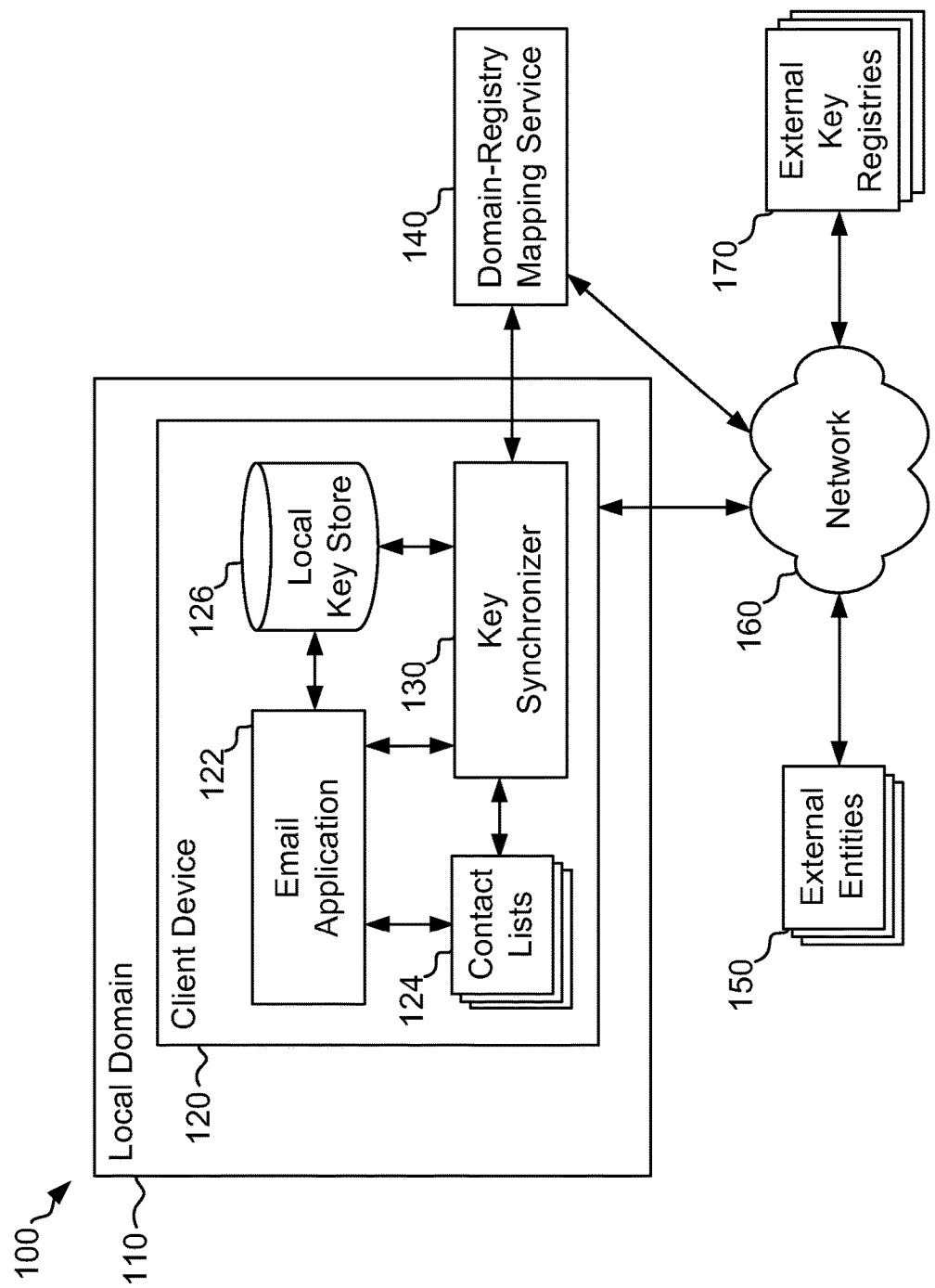
FIG. 1 is a block diagram of an example key synchronization system for automating client-side synchronization and discovery of public keys and certificates of external contacts, consistent with the principles of the present disclosure.

FIG. 1 illustrates an example system 100 for automating client-side synchronization and discovery of public keys and certificates of external contacts, consistent with the principles of the present disclosure. Public keys can include identity keys, digital or identity certificates (e.g., X.509 certificates), and the like. In various implementations, an example of which is shown in FIG. 1, system 100 includes a local domain 110 in which a client device 120 can operate. System 100 automates the client-side synchronization of public keys in a manner transparent to an email application 122 and other client-side applications. Client device 120 can locally store one or more contact lists 124 that are accessible to email application 122 and other client-side applications via at least one contact list API or plug-in. Contact lists 124 can include any collection of contacts corresponding to entities, and contacts corresponding to each entity can be used to address or identify the entity. Examples of contact lists 124 include address books, certificate stores, security services, buddy lists, etc. Client device 120 can locally store public keys of various contacts in a local key store 126, which email application 122 can search for and obtain locally-stored keys of a contact to secure communications and data exchanges with that contact. Local key store 126 simplifies the use of public key cryptography for secure communications and data exchanges without requiring any modification to email application 122 and other client-side applications, which encourages greater adoption of public key cryptography, and thus makes the Internet more secure.

System 100 includes a key synchronizer 130 that can run on client device 120 to obtain contacts from the client device 120, such as contact lists 124 and emails associated with email application 122, etc. To obtain contacts from client device 120, key synchronizer 130 can poll or parse any of contact lists 124, inbound emails sent by the contacts, draft emails specifying the contacts as recipients, outbound emails sent to the contacts, etc. Key synchronizer 130 can locally store, in local key store 126, more than one public key for each of the contacts. For example, key synchronizer 130 can locally store multiple public keys for one contact that expire at different times, so that when one of the contact's locally-stored public keys expires, key synchronizer 130 can transition to a different one of that contact's locally-stored public keys that is valid. Moreover, that contact's expired public key can be remain locally-stored in local key store 126 for archival purposes. In various implementations, key synchronizer 130 can search for and obtain only external contacts belonging to external entities 150 that operate in and/or are associated with external domains outside of local domain 110 of client device 120. Alternatively or in addition, key synchronizer 130 can filter the contacts to exclude contacts that are in local domain 110. External entities 150 can operate in external domains outside of local domain 110, and can be communicatively coupled to client device 120 via at least one network 160. Network 160 can include any combination of one or more wired or wireless communication networks, such as a local area network, a near-field communication link or network, a wide area network, a cellular network, the Internet, a cloud-based network, and the like.

System 100 can include a domain-to-registry mapping service 140 that provides a mapping between various domains and external key registries 170 responsible for provisioning public keys for the domains. System 100 can support a multiple types and instances of public key registries, such as external key registries 170 that operate outside of local domain 110.

An example public key registry includes a Domain Name System ("DNS")-based public key registry implementing DNS Security Extensions ("DNSSEC") and DNS-based Authentication of Named Entities ("DANE") that can store public keys in Secure/Multipurpose Internet Mail Extensions ("SMIME") "A" records ("SMIMEA") under domains corresponding to email addresses of various entities. The DNS-based public key registry can provide Public Key Infrastructure ("PKI") for secure storage and discovery of public keys. In addition to providing references to external key registries 170, the DNS-based public key registry can also provide assertions for the legitimacy of public keys in external key registries 170 via DNS records containing hashes and/or signatures. Synchronization of local key store 126 with the DNS-based public key registry greatly encourages the adoption of DNSSEC and DANE, and thus makes the Internet more secure and desirable as a platform for exchanging secure communications and data.

Moreover, public keys and certificates stored and cataloged in the DNS-based public key registry can be validated using the DNS. Therefore, synchronization of local key store 126 with the DNS-based public key registry can resolve the "too many certificate authorities" problem. For example, a malicious actor can convince a trusted certificate authority to sign unauthorized certificates. The malicious actor can use the unauthorized certificates to sign and send documents to a third party who will trust the unauthorized certificates based on the certificate authority's signature. Key synchronizer 130 can eliminate this attack vector, for example, by polling for validated certificates from the DNS-based public key registry and use the validated certificates to identify and/or remove the unauthorized certificates.

Other examples of the public key registry include the Massachusetts Institute of Technology Pretty Good Privacy ("PGP") Key Server, Keybase.io, blockchain, and Lightweight Directory Access Protocol ("LDAP") servers that have been set up to serve as public key registries.

Domain-to-registry mapping service 140 can select at least one public key registry of external key registries 170 to query for public keys belonging to entities in a particular domain. Domain-to-registry mapping service 140 can select the public key registry based on a configuration, security policy, or a user-selection (e.g., by a user of client device 120, an administrator in local domain 110, and the like). For example, an entity with 'jdoe@example.com' as an email address can be mapped to a public key registry implemented by an authoritative DNS server for '_smimecert.example.com'. Domain-to-registry mapping service 140 can run client-side on client device 120 or server-side on a server accessible to client device 120, such as a directory server (not shown). If domain-to-registry mapping service 140 is provided by a server, client device 120 can discover and access domain-to-registry mapping service 140 by using configuration information resident on client device 120 or, for greater flexibility, a service discovery protocol (e.g., DNS-SD) to discover and access domain-to-registry mapping service 140.

System 100 can include a key synchronization service (not shown), which can dynamically retrieve, from external key registries 170, an external contact's public key not found in local key store 126. System 100 can provide the key synchronization service via an API or a plug-in, and one or more client-side applications can be enhanced to call the key synchronization service to dynamically retrieve one or more external contacts' public keys that are not found in local key store 126. For example, email application 122 can be enhanced to call the key synchronization service, and when an email being drafted specifies the external entity as a recipient, email application 122, as enhanced, can use a key synchronization service API or plug-in to retrieve the external contact's public key from external key registries 170. System 100 can also allow client device 110 to specify a recursive server that supports privacy, for example, by providing encrypted connections between client device 110 and the recursive server. This allows client device 110 to protect the confidentiality of its users' communications, for example, by not leaking the fact that the users are sending an email to a recipient domain in one or more unencrypted user datagram protocol packets.

In various implementations, key synchronizer 130 can monitor client device 120 for any new or modified external contacts, and can also monitor local key store 126 for locally-stored copies of public keys that have become invalid, e.g., revoked, expired, about to expire, etc. While monitoring client device 120, key synchronizer 130 can poll contact lists 124, email application 122, or local key store 126 for external contacts that are new or modified and/or whose locally-stored copies of public keys have become invalid. Key synchronizer 130 can poll for such external contacts periodically or in response to key synchronization service requests.

Subsequent to obtaining the external contacts, key synchronizer 130 can identify external domains associated with the external contacts and query domain-to-registry mapping service 140 to select, based on the external domains, at least one external key registry of external key registries 170 to query for public keys belonging to the external contacts. Key synchronizer 130 can send a query to the selected external key registry to obtain registry-supplied public keys for the external contacts, as well as send a query to local key store 126 to access local copies of the external contacts' public keys. Key synchronizer 130 can synchronize local key store 126 with the selected external key registry based on the registry-supplied public keys. For example, key synchronizer 130 can determine, for each external contact, whether or not the local copy of the external contact's public key in the local key store is outdated or invalid by comparing the local copy to the external contact's registry-supplied public key. If the local copy is deemed outdated or invalid, then key synchronizer 130 can update local key store 126 with the registry-supplied public key for the external contact.

Figure 2A:
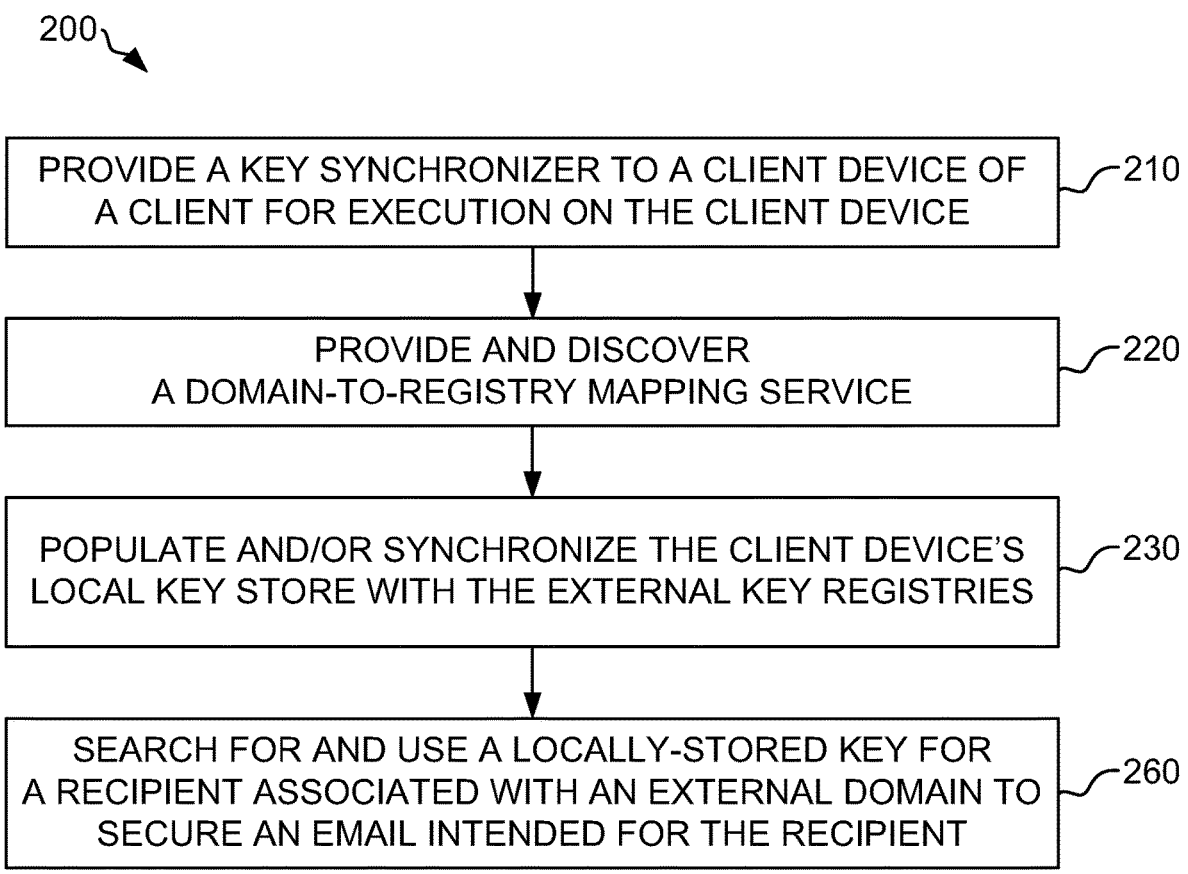
FIGS. 2A-C are flow diagrams of an example process performed by the key synchronization system for automating client-side synchronization and discovery of public keys and certificates of external contacts, consistent with implementations of the present disclosure.
Figure 2B:
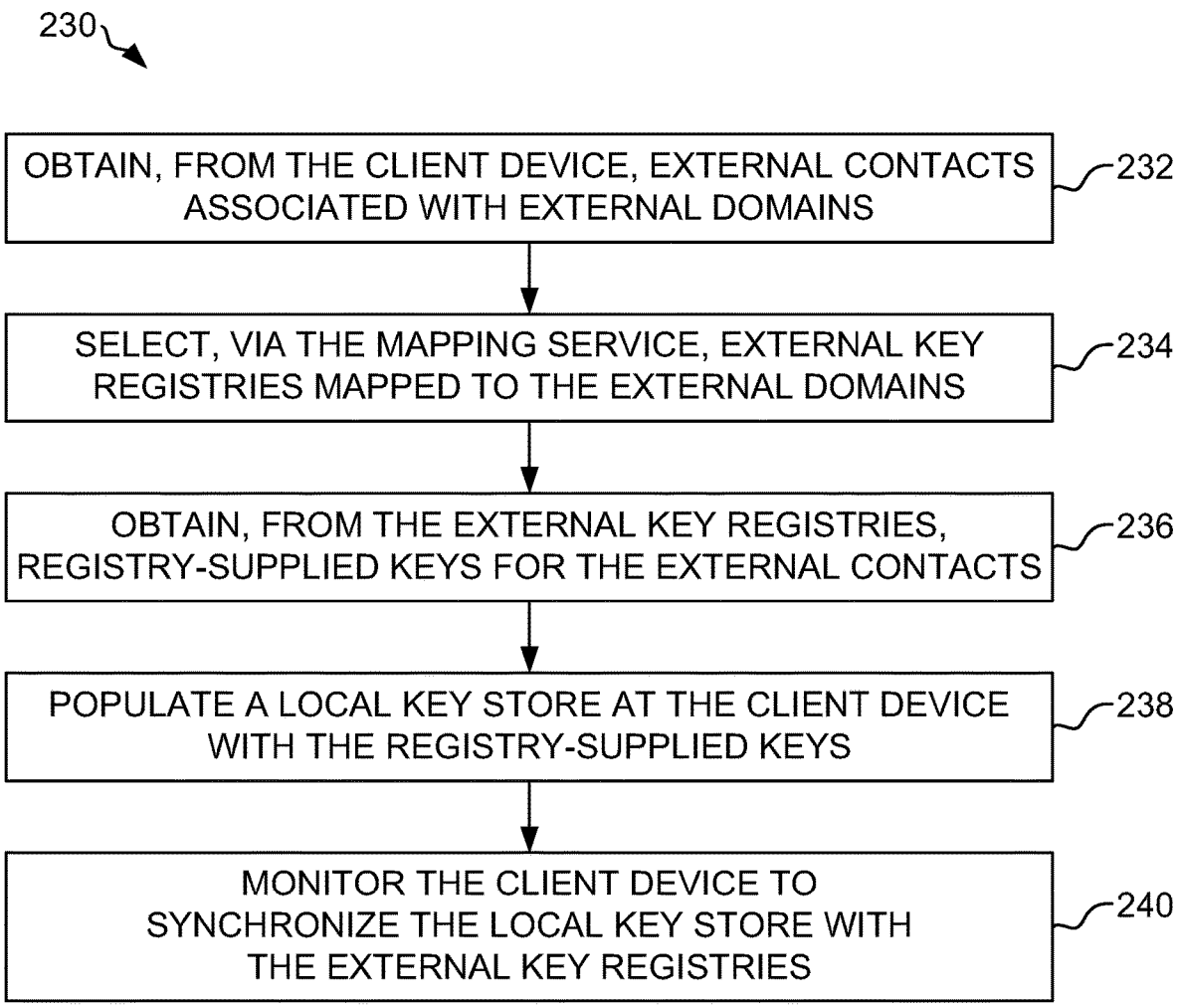
Figure 2C:
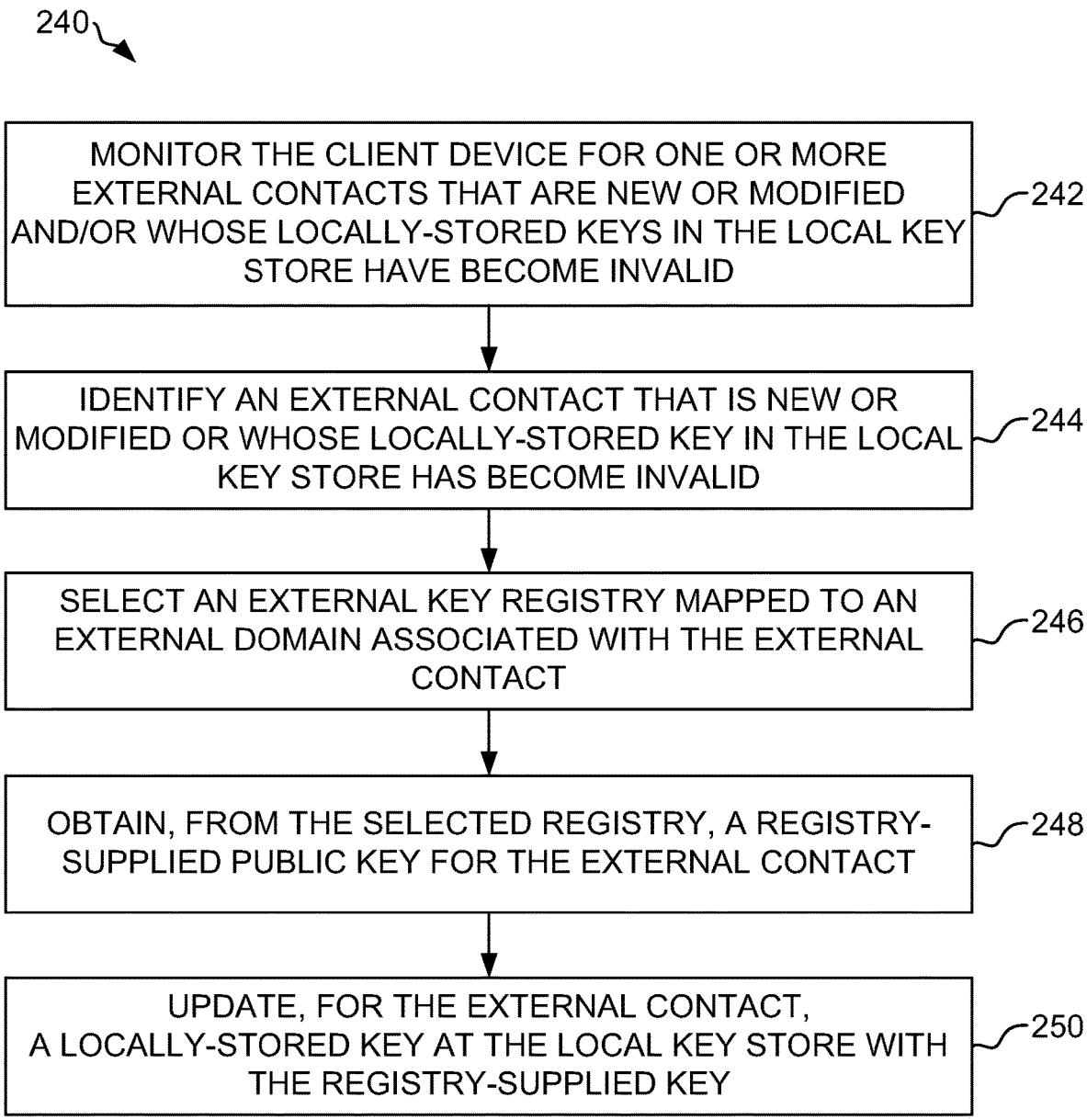

FIGS. 2A-C are flow diagrams of an example process 200 performed by a key synchronization system (e.g., system 100 as shown in FIG. 1) to automate client-side synchronization and discovery of public keys and certificates of external contacts, according to implementations of the present disclosure. At block 210 (as shown in FIG. 2A), the key synchronization system can provide a key synchronizer (e.g., key synchronizer 130) to a client device (e.g., client device 120) operating in a local domain (e.g., local domain 110) for execution on the client device. Next, at block 220, the key synchronization system can provide a domain-to-registry mapping service (e.g., domain-registry mapping service 140) that maps domains to external key registries (e.g., external key registries 170) responsible for provisioning public keys for the domains. The key synchronizer can discover and access the domain-to-registry mapping service to identify at least one external key registry mapped to one or more domains for public key provisioning.

At block 230, the key synchronizer can obtain external contacts from the client device and populate the client device's local key store (e.g., local key store 126) with public keys obtained from the external key registries for the client device's external contacts, as well as monitor the client device and synchronize the local key store with the external key registries. Block 230 is described in greater detail infra with respect to FIGS. 2B and 3. Then, at block 260, an email application (e.g., email application 122) running on the client device can secure an email intended for a recipient by searching for, obtaining, and using a copy of the recipient's public key stored locally in the local key store.

Figure 3:
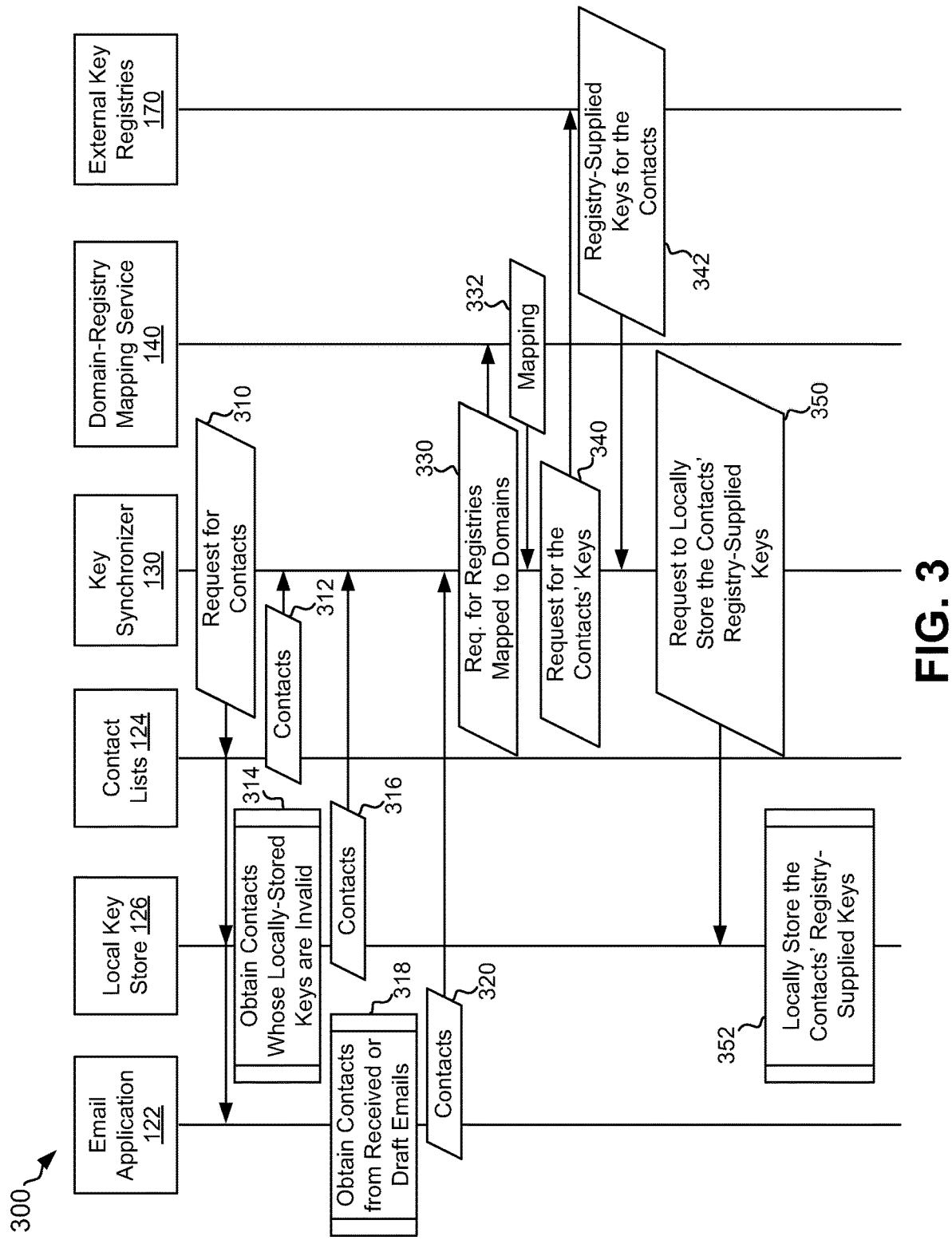
FIGS. 3 and 4 are flow diagrams of example processes performed by the key synchronization system to populate and synchronize a client device's local key store with public key registries, consistent with implementations of the present disclosure.

At block 232 (as shown in FIG. 2B), the key synchronizer can obtain external contacts from the client device, for example, by polling or parsing contact lists (e.g., contact lists 124) and emails stored on the client device. The key synchronizer can search for and obtain only external contacts belonging to external entities that operate in external domains outside of the client device's local domain. The key synchronizer can also filter the contacts to exclude contacts that are in the local domain. For example, as shown in FIG. 3 and described in greater detail infra, the key synchronizer can send a request for external contacts from the contact lists, the local key store, and/or the email application. In response to the request, the key synchronizer can obtain external contacts from the contact lists and can obtain, from the local key store, external contacts whose locally-stored copies of public keys are invalid. In response to the request, the email application can parse received emails or draft emails to obtain external contacts therein, and then the key synchronizer can obtain the external contacts from the email application.

Next, at block 234, the key synchronizer can access the domain-to-registry mapping service to select at least one of the external key registries responsible for provisioning public keys for the external domains. At block 236, the key synchronizer can obtain registry-supplied public keys for the external contacts from the selected external key registry, and then at block 238, the key synchronizer can populate the local key store with the registry-supplied public keys, thus locally storing the external contacts' public keys on the client device. Next, at block 240, the key synchronizer can monitor the client device to synchronize the local key store with the external key registries. Block 240 is described in greater detail infra with respect to FIGS. 2C and 4.

Figure 4:
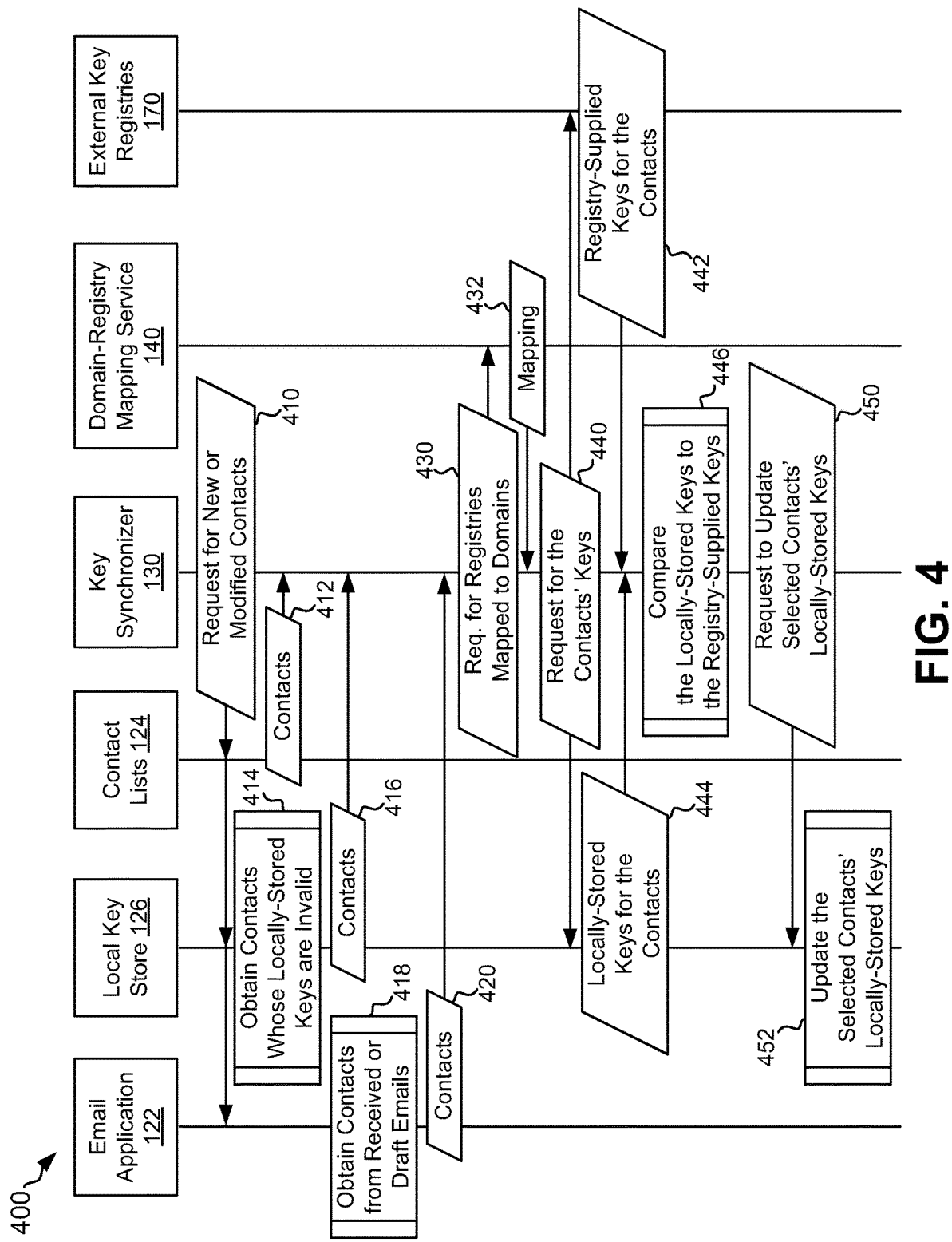

At block 242 (as shown in FIG. 2C), the key synchronizer can monitor the client device for new external contacts, modifications to existing external contacts, and locally-stored copies of external contacts' public keys that have become invalid, e.g., revoked, expired, about to expire, etc. While monitoring the client device, the key synchronizer can poll the contact lists, the email application, or the local key store for external contacts that are new or modified and/or whose locally-stored copies of public keys have become invalid. For example, as shown in FIG. 4 and described in greater detail infra, the key synchronizer can send a request to be notified of any new or modified external contact from the contact lists and/or the email application. The key synchronizer can also send a request to be notified of any external contact whose locally-stored copies of public keys have become invalid. In response to the notification request, the key synchronizer can be notified of any new or modified external contact in the contact lists and can be notified of any external contact whose locally-stored copy of public key is invalid. In response to the notification request, the email application can parse received emails or draft emails to obtain and notify the key synchronizer of new external contacts therein. The key synchronizer can poll for such external contacts periodically or in response to key synchronization service requests.

At block 244, the key synchronizer can identify, based on the monitoring, an external contact that is new or modified and/or whose locally-stored copy of public key has become invalid. Next, at block 246, the key synchronizer can query the domain-to-registry mapping service to select at least one of the external key registries responsible for provisioning public keys for an external domain associated with the external contact. At block 248, the key synchronizer can obtain, from the selected external key registry, a registry-supplied public key for the external contact. Then, at block 250, the key synchronizer can update the local key store with the registry-supplied public key, thus synchronizing the locally-stored public key for the external contact with the registry-supplied public key. For example, as shown in FIG. 4 and described in greater detail infra, the key synchronizer can compare the locally-stored public key for the external contact to the registry-supplied public key to determine whether or not the locally-stored public key is out of date or invalid. If the locally-stored public key is deemed to be out of date or invalid, the key synchronizer can send a request to the local key store to locally store the external contact's registry-supplied public key, and the local key store can respond by locally storing the registry-supplied public key for the external contact.

FIG. 3 is a flow diagram of an example process 300 performed by the key synchronization system to obtain external contacts from the client device and populate the client device's local key store with registry-supplied public keys for the external contacts, according to implementations of the present disclosure. At 310, the key synchronizer can send a request for external contacts to the contact lists via the contact list API or plug-in, the local key store, and/or the email application. At 312, the contact list API or plug-in can obtain external contacts from the contact list and then respond to the key synchronizer's request with the external contacts. At 314, the local key store can obtain external contacts whose locally-stored copies of public keys are invalid, and then at 316, respond to the key synchronizer's request with the external contacts. At 318, the email application can parse received emails or draft emails to obtain external contacts therein, and then at 320, respond to the key synchronizer's request with the external contacts.

At 330, the key synchronizer can send a service request to the domain-to-registry mapping service to identify which of the external key registries are mapped to external domains associated with the external contacts. Next, at 332, the domain-to-registry mapping service can respond to the key synchronizer's service request by providing a mapping that identifies one or more of the external key registries responsible for provisioning public keys for contacts in the external domains.

At 340, the key synchronizer can send a request to the one or more external key registries for the external contacts' public keys. At 342, the one or more external key registries can respond to the key synchronizer's request by providing registry-supplied public keys for the external contacts to the key synchronizer. Then, at 350, the key synchronizer can send a request to locally store the external contacts' registry-supplied public keys in the local key store. Finally, at 352, the local key store can respond to the key synchronizer's request by locally storing the registry-supplied public keys for the external contacts.

FIG. 4 is a flow diagram of an example process 400 performed by the key synchronization system to monitor the client device and synchronize the local key store with the external key registries, according to implementations of the present disclosure. At 410, the key synchronizer can send a request to the contact list API or plugin and/or the email application to notify the key synchronizer of any new or modified external contact. The key synchronizer can also send a request to the local key store to notify the key synchronizer of any external contact whose locally-stored public key has become invalidated, At 412, the contact list API or plug-in can identify one or more external contacts in the contact lists that are new or modified and then notify the key synchronizer of the external contacts. At 414, the local key store can identify one or more external contact whose locally-stored copies of public keys have become invalid, and then at 416, notify the key synchronizer of the external contacts. At 418, the email application can parse received emails or draft emails to identify one or more new external contacts therein, and then at 420, notify the key synchronizer of the external contacts.

At 430, the key synchronizer can send a service request to the domain-to-registry mapping service to identify which of the external key registries are mapped to one or more external domains associated with the external contacts. Next, at 432, the domain-to-registry mapping service can respond to the key synchronizer's service request by providing a mapping that identifies one or more of the external key registries responsible for provisioning public keys for contacts in the external domains.

At 440, the key synchronizer can send a request to the external key registries for the external contacts' public keys and a request to the local key store for locally-stored copies of the external contacts' public keys. Next, at 442, the one or more external key registries can respond to the key synchronizer's request by providing one or more registry-supplied public keys for the external contacts to the key synchronizer. And at 444, the local key store can respond to the key synchronizer's request by providing one or more locally-stored copies of the external contacts' public keys to the key synchronizer. Then, at 446, the key synchronizer can compare the locally-stored copies of the external contacts' public keys to the registry-supplied public keys to select external contacts whose locally-stored copies of public key are out of date. At 450, the key synchronizer can send a request to locally store the selected external contacts' registry-supplied public keys in the local key store. Finally, at 452, the local key store can respond to the key synchronizer's request by locally storing the registry-supplied public keys for the selected external contacts.

It will be appreciated that processes 200, 300, and 400 described herein are illustrative and that variations and modifications are possible. Acts described as sequential can be executed in parallel, order of acts can be varied, and acts can be modified or combined. While the disclosure has been described with respect to specific implementations, those skilled in the art will recognize that numerous modifications are possible. For instance, the key synchronizer and the key synchronization system can have additional functionalities not mentioned herein. In addition, implementations of the present disclosure can be realized using any combination of dedicated components and/or programmable processors and/or other programmable devices. While the implementations described above can make reference to specific hardware and software components, those skilled in the art will appreciate that different combinations of hardware and/or software components can also be used and that particular operations described as being implemented in hardware might also be implemented in software or vice versa.

Figure 5:
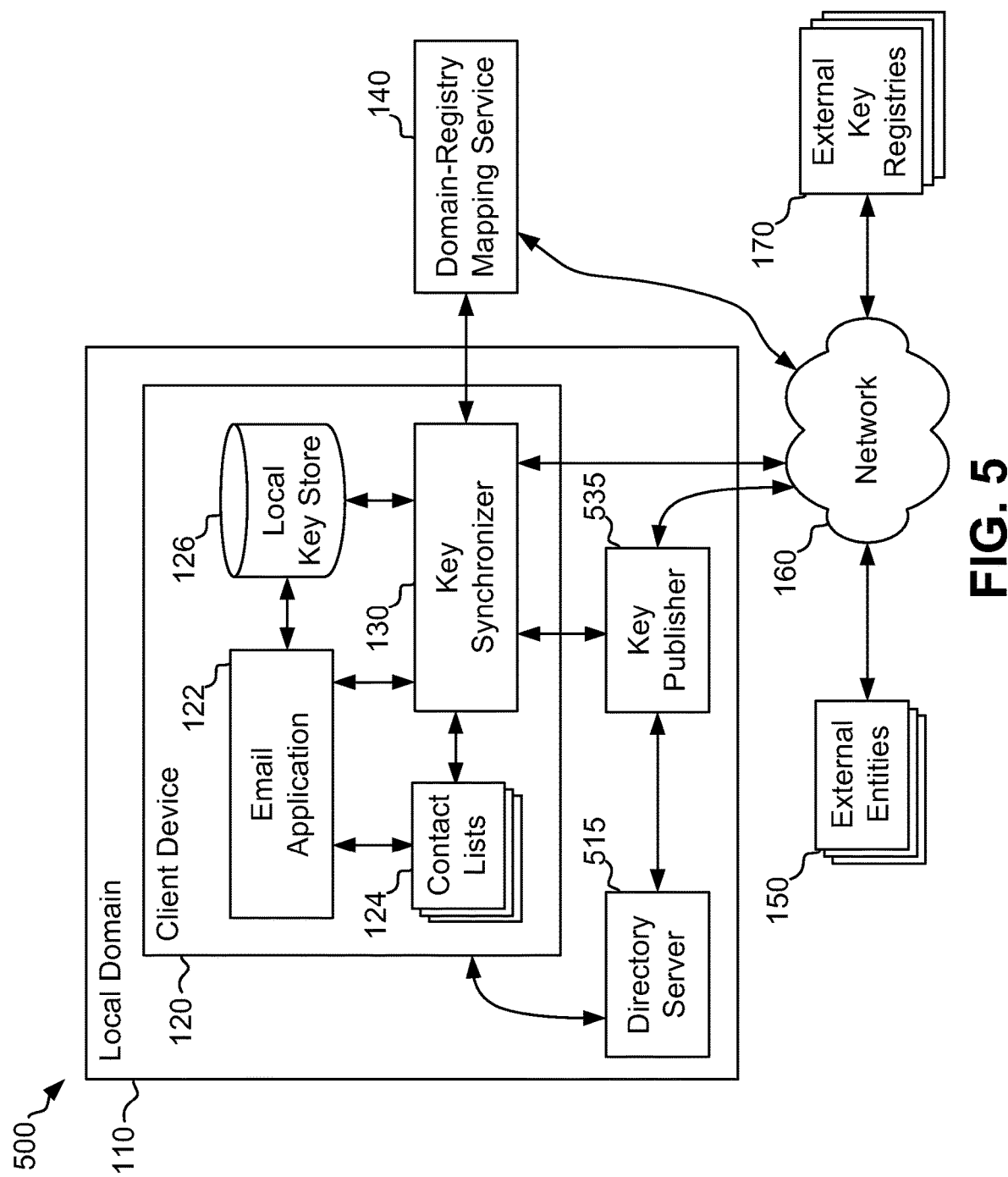
FIG. 5 is a block diagram of an example key publication system for automating synchronization of public keys and certificates of local contacts with the public key registries, consistent with the principles of the present disclosure.
Figure 6:
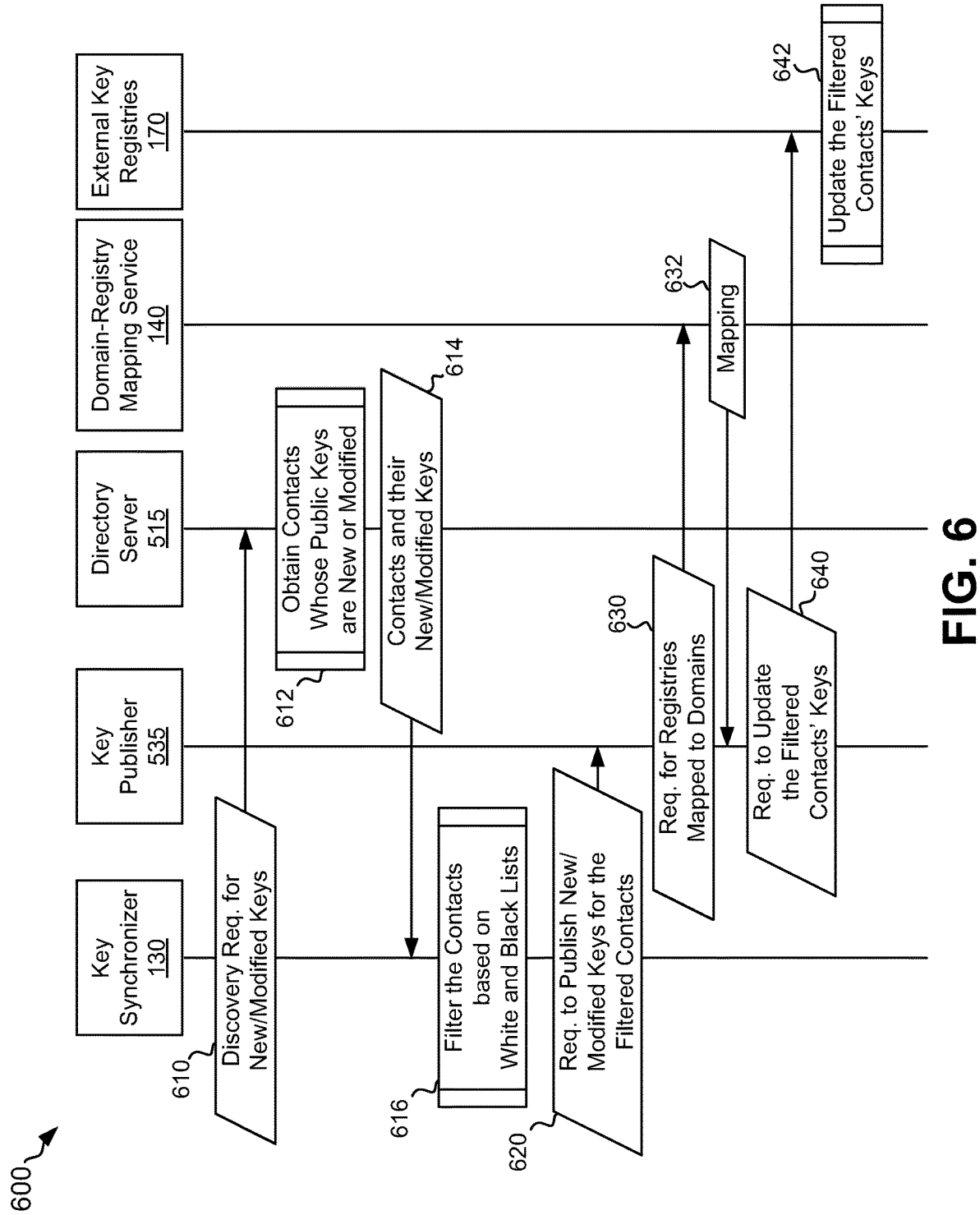
FIG. 6 is a flow diagram of an example process performed by the key publication system to synchronize the local contacts' public keys and certificates with the public key registries, consistent with implementations of the present disclosure.

FIG. 5 illustrates an example system 500 for automating synchronization of public keys and certificates of the local domain's entities with the public key registries, and FIG. 6 is a flow diagram of an example process performed by system 500 to synchronize the local contacts' public keys and certificates with the public key registries, consistent with implementations of the present disclosure.

In various implementations, an example of which is shown in FIG. 5, system 500 can include system 100 as shown in FIG. 1 and further include a directory server 515 and a key publisher 535. Directory server 515 can include one or more directory servers for local domain 110 (e.g., an organization's local network or intranet) containing information related to local contacts in local domain 110, examples of which include an LDAP (e.g., MICROSOFT ACTIVE DIRECTORY, APACHE DIRECTORY, etc.) server, a managed DNS server, and the like. Local contacts can include contacts of local entities such as individuals, computers, servers, etc., or groups thereof that operate in and/or are associated with local domain 110. Key publisher 535 can automate synchronization of the local contacts' public keys with external key registries 170. As shown in FIG. 5, key publisher 535 can operate in local domain 110 and outside of key synchronizer 130 running on client device 120. Alternatively or in addition, key synchronizer 130 can provide (not shown) key publisher 535, and thus key publisher 535 can run on client device 120 as a part of key synchronizer 130.

System 500 can address the difficulty in making public keys available to entities in different domains that rely on public key cryptography to securely exchange messages and data. To ensure effective use of public key cryptography in inter-domain exchanges, the entities must be able to retrieve the public keys from a public key registry (e.g., one of external key registries 170) or other publicly accessible sources. To make a local entity's public key available in the public key registry, the public key must be published to the public key registry under an identifier that is associated with the local entity to which the public key applies, such as a local contact of the local entity. Existing practices for publishing public keys typically require manual processes requiring user interaction that can be time consuming and challenging to learn and perform, thus inhibiting adoption of public key cryptography.

System 500 can resolve the above-described difficulty and other issues by automating synchronization of local entities' public keys with those stored in external key registries 170. Key publisher 535 in system 500 can communicate or operate in conjunction with key synchronizer 130 to obtain and use the local entities' information from directory server 515 and to publish the local entities' public keys to external key registries 170. Each local entity's information can include, for example, at least one local contact (e.g., an email address) of the local entity, at least one public key of the local entity, and the like. System 500 can discover public keys by periodically searching through directory server 515 for local entities and their associated public keys (e.g., blocks 610-614 as shown in FIG. 6). Directory server 515 can also push such information to key publisher 535 in response to additions, deletions, and updates made to at least one local directory (e.g., blocks 612 and 614). System 500 can publish new or modified public keys into one or more of external key registries 170 (e.g., block 620-642), and can also delete (i.e., unpublish) public keys for local entities that are no longer in the local directory.

System 500 can periodically query external key registries 170 to find published public keys for the local entities, verify the published public keys against those stored in directory server 515, and then perform updates and deletes so that the local entities' public keys stored in external key registries 170 are consistent with the local entities' public keys stored in directory server 515. When searching the local directory, system 500 can use "white" and "black" lists to filter which local entities are subject to discovery and consequent publishing of their public keys (e.g., block 616). A white list can contain criteria for selecting local entities whose public keys are to be published. A black list can contain criteria for selecting local entities whose public keys are not to be published.

System 500 can support a multiple types and instances of external key registries 170 that operate outside of local domain 110. An example external key registry includes the DNS-based public key registry implementing DNSSEC and DANE that can store public keys in SMIMEA under domains corresponding to email addresses of the local entities. The DNS-based public key registry can provide assertions for the legitimacy of public keys in external key registries 170 via DNS records containing hashes and/or signatures. System 500 can register local entities into the DNS-based public key registry based on local domain 110 associated with the local entities. For instance, a local entity with the email address 'jdoe@example.com' can be mapped to an authoritative DNS server for '_smimecert.example.com' DNS zone. System 500 can determine the authoritative DNS server's identity by means of the DS record found in the parent zone, 'example.com'. System 500 can then interact with the administrative functions for the authoritative DNS server to publish the public key for the local entity as an SMIMEA record under 'joe._smimecert.example.com'. One skilled in the art would understand that different means for identifying an entity, different mechanisms for associating a public key with the entity, different means for identifying authoritative servers, and different administrative interfaces provided by the authoritative servers for public key registries are possible. Other examples of the external key registry include the MIT PGP Key Server, Keybase.io, blockchain, and LDAP servers that have been set up to serve as public key registries.

Figure 7:
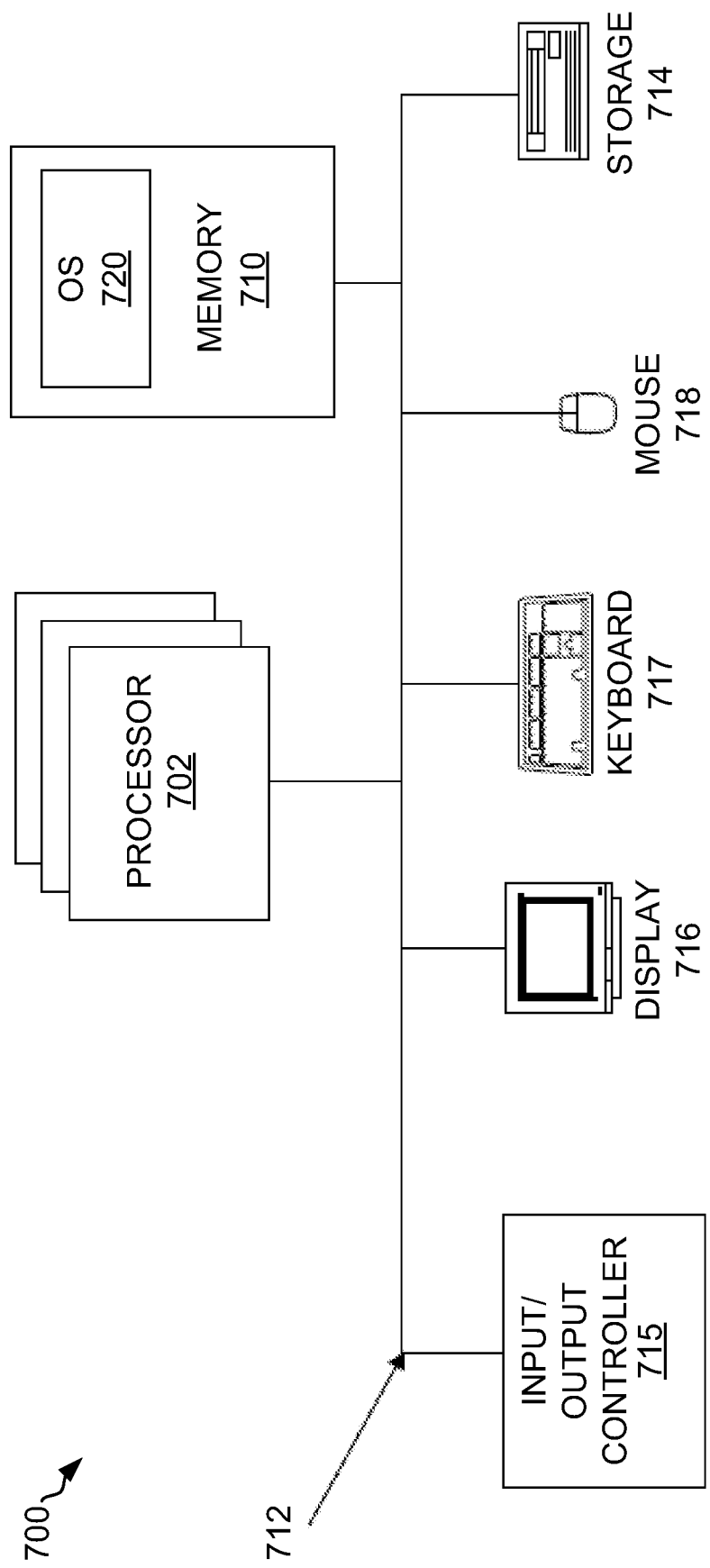
FIG. 7 is an example computer system for performing the disclosed implementations, consistent with the present disclosure.

FIG. 7 illustrates a computer system 700 that is consistent with implementations of the present disclosure. In general, implementations of a key synchronizer (e.g., key synchronizer 130) in a key synchronization system (e.g., key synchronization system 100) may be implemented in various computer systems, such as a mobile device, a personal computer, a server, a workstation, an embedded system, a communication device, or a combination thereof. Certain implementations of the key synchronizer may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 700 is shown as a general purpose computer that is well known to those skilled in the art. Examples of the components that may be included in system 700 will now be described.

As shown, system 700 may include at least one processor 702, a keyboard 717, a pointing device 718 (e.g., a mouse, a touchpad, and the like), a display 716, main memory 710, an input/output controller 715, and a storage device 714. Storage device 714 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program implementation of the key synchronizer can be stored on, for example, storage device 714. System 700 may also be provided with additional input/output devices, such as a printer (not shown). The various components of system 700 communicate through a system bus 712 or similar architecture. In addition, system 700 may include an operating system (OS) 720 that resides in memory 710 during operation. One skilled in the art will recognize that system 700 may include multiple processors 702. For example, system 700 may include multiple copies of the same processor. Alternatively, system 700 may include a heterogeneous mix of various types of processors. For example, system 700 may use one processor as a primary processor and other processors as co-processors. For another example, system 700 may include one or more multi-core processors and one or more single core processors. Thus, system 700 may include any number of execution cores across a set of processors (e.g., processor 702). As to keyboard 717, pointing device 718, and display 716, these components may be implemented using components that are well known to those skilled in the art. One skilled in the art will also recognize that other components and peripherals may be included in system 700.

Main memory 710 serves as a primary storage area of system 700 and holds data that is actively used by applications, such as the key synchronizer in the key synchronization system, running on processor 702. One skilled in the art will recognize that applications are software programs that each contains a set of computer instructions for instructing system 700 to perform a set of specific tasks during runtime, and that the term "applications" may be used interchangeably with application software, application programs, device drivers, and/or programs in accordance with implementations of the present teachings. Memory 710 may be implemented as a random access memory or other forms of memory as described below, which are well known to those skilled in the art.

OS 720 is an integrated collection of routines and instructions that are responsible for the direct control and management of hardware in system 700 and system operations. Additionally, OS 720 provides a foundation upon which to run application software and device drivers. For example, OS 720 may perform services, such as resource allocation, scheduling, input/output control, and memory management. OS 720 may be predominantly software, but may also contain partial or complete hardware implementations and firmware. Well known examples of operating systems that are consistent with the principles of the present teachings include MICROSOFT WINDOWS, MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor (e.g., processor 402), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one implementation be plural or distributed, and resources described as multiple or distributed can in implementations be combined. The scope of the present teachings is accordingly intended to be limited only by the following claims. Although the invention has been described with respect to specific implementations, it will be appreciated that the invention is intended to cover all modifications and equivalents within the scope of the following claims.

What is claimed is:

1. A client device for automating client-side public key synchronization, comprising:
   a key synchronizer that obtains cryptographic keys from at least one remote source;
   a local key store that stores at least one cryptographic key; and
   a memory storing instructions that, when executed by at least one processor of the key synchronizer, cause the key synchronizer to perform a method comprising:
      obtaining, from a first application that applies the at least one cryptographic key stored in the local key store, an external contact associated with an external domain outside of a local domain of the client device, wherein the first application does not obtain a registry-supplied public key for the external contact;
      querying a mapping service for an external key registry responsible for providing public cryptographic keys associated with the external domain;
      receiving, from the mapping service, an identification of the external key registry, wherein the external key registry includes a key registry outside of the local domain that stores one or more public keys, and the external key registry implements an Internet security protocol that provides assertions for the legitimacy of the one or more public keys;
      obtaining, from the external key registry, the registry-supplied public key for the external contact; and
      causing the registry-supplied public key to be stored in the local key store as a locally-stored key,
      wherein the first application secures an email, targeting the external contact as a recipient of the email, by retrieving the locally-stored key from the local key store, and applying the locally-stored key to the email.

2. The client device of claim 1, wherein the Internet security protocol includes at least one of:
   a Domain Name System (DNS) with DNS Security Extensions (DNSSEC); or
   a DNS with DNS-based Authentication of Named Entities (DANE).

3. The client device of claim 2, wherein obtaining the registry-supplied public key comprises:
   accessing at least one Secure/Multipurpose Internet Mail Extensions A record (SMIMEA) of the external key registry, wherein the at least one SMIMEA is under the external domain associated with the external contact; and
   obtaining, from the at least one SMIMEA, the registry-supplied public key.

4. The client device of claim 1, further comprising:
   a contact list that includes at least one of an address book, a certificate store, or a network security service,
   wherein the first application adds the external contact to the contact list.

5. The client device of claim 1, wherein the first application obtains the external contact from an inbound email received by the client device, wherein the external contact is a sender of the inbound email.

6. The client device of claim 1, wherein the first application obtains the external contact from a draft email being composed in the first application, wherein the external contact is a recipient of the draft email.

7. The client device of claim 1, wherein the instructions cause the key synchronizer to further perform:
   identifying a separate client device for at least one new or modified external contact;
   obtaining, from the external key registry, at least one registry-supplied key for the at least one new or modified external contact; and
   storing, in the local key store, the at least one registry-supplied key as at least one locally-stored key the at least one new or modified external contact.

8. The client device of claim 1, wherein the instructions cause the key synchronizer to further perform:
   determining, based on a public key corresponding to the external contact, that a current locally-stored key corresponding to the external contact is invalid; and
   replacing, in the local key store, the locally-stored key for the external contact with the registry-supplied public key.

9. A method for automating client-side public key synchronization, the method comprising:
   obtaining, by a key synchronizer from a first application that applies at least one cryptographic key stored in a local key store, an external contact associated with an external domain outside of a local domain of a client device, wherein the first application does not obtain a registry-supplied public key for the external contact, and wherein the key synchronizer and the first application are both included in the client device;
   querying, by the key synchronizer, a mapping service for an external key registry responsible for providing public cryptographic keys associated with the external domain;
   receiving, by the key synchronizer from the mapping service, an identification of the external key registry, wherein the external key registry includes a key registry outside of the local domain that stores one or more public keys, and the external key registry implements an Internet security protocol that provides assertions for the legitimacy of the one or more public keys;
   obtaining, by the key synchronizer from the external key registry, the registry-supplied public key for the external contact; and
   causing, by the key synchronizer, the registry-supplied public key to be stored in the local key store included in the client device as a locally-stored key,
   wherein the first application secures an email, targeting the external contact as a recipient of the email, by retrieving the locally-stored key from the local key store, and applying the locally-stored key to the email.

10. The method of claim 9, wherein the Internet security protocol includes at least one of:
    a Domain Name System (DNS) with DNS Security Extensions (DNSSEC); or a DNS with DNS-based Authentication of Named Entities (DANE).

11. The method of claim 10, wherein obtaining the public registry-supplied key further comprises:
  accessing at least one Secure/Multipurpose Internet Mail Extensions A record (SMIMEA) of the external key registry, wherein the at least one SMIMEA is under the external domain associated with the external contact; and
  obtaining, from the at least one SMIMEA, the registry-supplied public key.

12. The method of claim 9, wherein obtaining the external contact further comprises:
  obtaining the external contact from a contact list included in the client device,
  wherein the contact list includes at least one of an address book, a certificate store, or a network security service, and the first application added the external contact to the contact list.

13. The method of claim 9, wherein obtaining the external contact further comprises:
  obtaining, by the first application, the external contact from an inbound email at the client device, wherein the external contact is a sender of the inbound email.

14. The method of claim 9, wherein obtaining the external contact further comprises:
  obtaining, by the first application, the external contact from a draft email being composed in the first application, wherein the external contact is a recipient of the draft email.

15. The method of claim 9, further comprising:
  identifying, by the key synchronizer, a separate client device for at least one new or modified external contact;
  obtaining, by the key synchronizer from the external key registry, at least one registry-supplied key for the at least one new or modified external contact; and
  storing, in the local key store the at least one registry-supplied key as at least one locally-stored key for the at least one new or modified external contact.

16. The method of claim 9, further comprising:
  determining, based on a public key corresponding to the external contact, that a current locally-stored key corresponding to the external contact is invalid; and
  replacing, in the local key store, the locally-stored key for the external contact with the registry-supplied public key.

17. One or more non-transitory computer-readable storage media including instructions that, when executed by one or more processors of a client device, causes the one or more processors to execute a method for automating client-side public key synchronization, the method comprising:
  obtaining, by a key synchronizer from a first application that applies at least one cryptographic key stored in a local key store, an external contact associated with an external domain outside of a local domain of the client device, wherein the first application does not obtain a registry-supplied public key for the external contact, and wherein the key synchronizer and the first application are both included in the client device;
  querying, by the key synchronizer, a mapping service for an external key registry responsible for providing public cryptographic keys associated with the external domain;
  receiving, by the key synchronizer from the mapping service, an identification of the external key registry, wherein the external key registry includes a key registry outside of the local domain that stores one or more public keys, and the external key registry implements an Internet security protocol that provides assertions for the legitimacy of the one or more public keys;
  obtaining, by the key synchronizer from the external key registry, the registry-supplied public key for the external contact; and
  causing, by the key synchronizer, the registry-supplied public key to be stored in the local key store included in the client device as a locally-stored key,
  wherein the first application secures an email, targeting the external contact as a recipient of the email, by retrieving the locally-stored key from the local key store, and applying the locally-stored key to the email.

* * * * *